US006836742B2

(12) United States Patent
Brekenfeld

(10) Patent No.: US 6,836,742 B2
(45) Date of Patent: Dec. 28, 2004

(54) METHOD AND APPARATUS FOR PRODUCING MASS SPECTROMETER SPECTRA WITH REDUCED ELECTRONIC NOISE

(75) Inventor: Andreas Brekenfeld, Hollerlander Weg (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 10/281,059

(22) Filed: Oct. 25, 2002

(65) Prior Publication Data

US 2003/0114993 A1 Jun. 19, 2003

(30) Foreign Application Priority Data

Oct. 25, 2001 (DE) ........................................ 101 52 821

(51) Int. Cl.[7] ................................................ G06F 19/00
(52) U.S. Cl. ...................................................... 702/104
(58) Field of Search .................. 702/104, 23; 600/372, 600/544; 382/207; 364/417, 731, 70, 413; 128/731; 367/70; 250/282, 288

(56) References Cited

U.S. PATENT DOCUMENTS

| | | | | | |
|---|---|---|---|---|---|
| 4,744,029 | A | * | 5/1988 | Raviv et al. | 600/544 |
| 5,003,986 | A | * | 4/1991 | Finitzo et al. | 600/544 |
| 5,367,162 | A | | 11/1994 | Holland et al. | |
| 5,440,119 | A | | 8/1995 | Labowsky | |

FOREIGN PATENT DOCUMENTS

| | | | |
|---|---|---|---|
| GB | 2 334 813 | A | 9/1999 |
| JP | 2000299083 | A | 10/2000 |

* cited by examiner

*Primary Examiner*—John Barlow
*Assistant Examiner*—Tung S Lau

(57) ABSTRACT

The invention relates to the removal of electronic noise from mass spectra which are scanned as single spectra and added together to give a sum spectrum. The invention consists in removing the noise in the single spectra and not in the sum spectrum since ion signals and electronic noise can only be distinguished in the single spectra.

9 Claims, 1 Drawing Sheet

METHOD AND APPARATUS FOR PRODUCING MASS SPECTROMETER SPECTRA WITH REDUCED ELECTRONIC NOISE

FIELD OF THE INVENTION

The invention relates to the removal of electronic noise from mass spectra which are scanned as single spectra and added together to give a sum spectrum.

BACKGROUND OF THE INVENTION

Many types of mass spectrometer obtain single spectra in rapid succession. These contain the signals of only a few ions and are therefore of poor quality in regard to the reproducibility of the signal intensities for each ion species in the mass spectrum. These spectra, sometimes scanned at very high frequencies of several kilohertz, are then immediately added up in the computer system of the mass spectrometer to form a sum spectrum in order to obtain a usable spectrum for the ion species of different masses with signals which have less fluctuation. The addition is also used to increase the measurement dynamics since very fast digitizers with rates in the GHz range have data-bus widths of only 8 bits.

At this point, it would be appropriate to describe a few very different examples of these types of mass spectrometer:

Time-of-Flight mass spectrometer with ionization by Matrix-Assisted Laser Desorption and Ionization (MALDI-TOF). In this case, typically, 50–200 and in some instruments even 1,000 spectra are added. These are scanned at a rate of 10–100 spectra per second and with a scanning width of up to 200,000 measurement points per spectrum. The digitizing rate is approximately one to four GHz with a conversion width of 8 bits. 5–100 ms are available for adding the spectra, depending on the scanning rate -i.e. 25–500 ns per measurement point. In most cases, the spectra are transferred to a computer after each single spectrum is scanned and not processed further until they have arrived.

Time-of-flight mass spectrometers with Orthogonal Time-of-Flight (OTOF) where an analog-to-digital converter is used. In this case, 1,000–5,000 spectra are added. These are scanned at a rate of 20,000 spectra per second. Each spectrum contains 25,000 measurement points; the digitizing rate is approximately 500 MHz with a data bus width of 8 bits. The addition takes place in digitizing transient recorders which have been specially developed for this task. The spectra are scanned directly one after the other; thus, only 2 ns are available for each addition. The transient recorders have been specially developed for low background noise, which has to be lower than one count of a digitized converter. In spite of this, switching peaks are still present. Even if these only amount to one bit each and only appear occasionally, if they always appear in the same place, they easily add up to form pseudopeaks which have nothing to do with the genuine ion peaks.

Ion-Trap Mass Spectrometers (ITMS) usually operate with the addition of only 5, and in borderline cases up to 200, spectra, depending on the analytical task. The spectra are scanned at the rate of 5 to 10 spectra per second and each spectrum contains up to 50,000 measurement points. The digitizing rate is 300 kHz and uses a data bus width of 12 to 16 bits; the electronic noise amounts to a few counts of the digitized measurement value. Large numbers of spectra are required, especially for the analysis of large biomolecules with ionization by static nanospray, since there are only a few ions in the part of the measurement range which can be evaluated. The electron-spray ionization (ESI) method which is usually used causes the ions to spread across many charge states; there are therefore very large numbers of ion species giving mass signals with different mass-to-charge ratios; only occasionally an ion signal adds to such a mass signal during subsequent spectrum scans.

Each single mass spectrum usually contains electronic noise along with the ion signals. At high conversion bus widths from 12 to 16 bits, the electronic noise usually amounts to a few counts of the digital converter. At smaller conversion bus widths of 8 bits, the noise is less and the background signal usually amounts to the same count but in this case, both the conversion rates and the numbers of single spectra which have to be summed are very large.

The ions can be normal ions which add up to produce a mass signal (also referred to as a mass peak) in the sum spectrum or scatter ions which, by avoiding the clean, mass spectrometric ion separation, fall on the detector at some point in time to produce an ion signal. When the spectra are added, the scatter ions do not produce a mass peak to indicate the presence of ion species of a certain mass-to-charge ratio but add up to form a broad band of background noise which cannot be separated from the summed electronic noise.

In all of the mass spectrometers listed above, secondary electronic multipliers (SEV) are used for measuring the ion beams. These basically can be adjusted so that a single ion gives a signal which stands out from the electronic noise. When these spectra are summed, the ion signals are added together, but so is the electronic noise. The zero point of the amplifier is usually adjusted so that the center line of the noise signal is somewhat above the zero line and therefore it is possible to check on the spectrum that none of the useful signal is cut off. Accordingly, during the addition process, the center line of the noise increases as does the noise itself; the center line increases linearly with the number of spectra and the noise increases with the root of the number of spectra.

One means which is occasionally used to suppress the electronic noise consists of suppressing the center line of the noise to below the zero line of the analog-to-digital converter (ADC) by applying a slight negative bias voltage to the preamplifier (the amplifier before the conversion of the analog value into a digital value). In this way, the electronic noise of each single spectrum is cut off, but with a similar amount of the useful signal. However, since the center line of the noise over the single spectrum can move into the positive or negative area over the mass range, this method cannot always be applied without cutting off large portions of the useful signal. Apart from this, the method removes any control over the drift of the zero line, which means, for example, that the center-line drift caused by temperature effects can no longer be detected and corrected.

The technique which has been used until now involves smoothing the background noise and removing the background from the sum spectrum alone. By so doing, mass peaks consisting of only a few ions are regularly lost since they no longer stand out from the noise. The technique derives from an era when computers were still too slow to process single spectra in any way whatsoever before summation.

SUMMARY OF THE INVENTION

The basic idea of the invention is to eliminate the electronic noise from the single spectra (and no longer from the sum spectrum) by using very fast computers and computer methods since in the single spectra it is still possible to distinguish between electronic noise and ion signals—even those of ions appearing individually. Since the summation of the spectra to form a sum spectrum regularly takes place in real time (if only because of the enormous quantities of memory which would otherwise be needed), there is very little time available. However, with skilful programming, the very fast signal processors which are available today can perform this task even for very high spectral-scanning frequencies.

With a moderate amount of processor time, a noise band either side of the center line of the noise is defined and all signal values which do not exceed the noise band are not added to the sum spectrum; the value of the center line is subtracted from all the signal values which do exceed the noise band before they are added to the sum spectrum. In this case, the width of the noise band is selected so that it is smaller than the signal height of a single ion. It is expedient for the center line of the noise to be calculated as a sliding average value over a predeterminable number of measurements for this purpose.

In a simpler and faster embodiment of the invention, during the summation process of the single spectra, only those measured values which exceed a certain threshold value are added to the sum spectrum. For spectra in which an accurate quantitative evaluation is not essential, the center value for the noise does not need to be subtracted. However, even without subtracting the average noise, quantitative evaluation is possible after appropriate calibration.

In another embodiment of the invention, which requires more processor time, the width and the position of the noise band can be adjusted dynamically. The position of the noise band can be controlled by the position of the sliding average value. If, for example, less than 30% (adjustable) of the measured values are located in the interval for the sliding average value, then the width of the noise band can be increased automatically by an adjustable width step. It has been found from a few types of mass spectrometry that the electronic noise in the spectrum increases as the ion masses increase in size; in other types of mass spectrometry, an increased proportion of noise has been observed in certain areas of the spectrum. For a new single spectrum, the noise band is then reset to the initial value.

The noise band can also be spread asymmetrically, depending on the number of signal values which exceed the band, upwards or downwards.

The initial value reset can also be controlled dynamically, for example, by using the result of the sliding average value calculation at the beginning of the spectrum last scanned as the initial value and by using the initial standard deviation of the last spectrum for establishing the width of the noise band.

In another embodiment of the invention, the sliding average is also used to regulate the zero-line adjustment by setting the bias voltage of the pre-amplifier to specified values.

The result of this measure, which sounds simple but is not so simple technically, is surprising since the resulting spectra are of a quality and degree of freedom from noise previously unknown. It has been found that, with well-designed mass spectrometers which have been designed to keep the proportion of vagabond scattered ions small, spectra are obtained which not only have no electronic noise by are also practically free of background noise caused by scattered ions. In large numbers of single spectra, ions which were previously regarded as scattered ions in the single spectra are summed to provide sensible mass signals.

Finally, this measure certainly makes it possible to distinguish between vagabond scattered ions and ions which, when added, form mass peaks. This invention can be used to improve the mass spectrometer in regard to suppressing the vagabond scattered ions.

Particularly in ion traps, eliminating the electronic noise also results in a significant improvement in the control of the optimum number of ions. When filling the ion traps with substances at very low concentration which produce only very weak ion beams, it is possible to approach the overdriving limit for the amplifier more closely. This significantly improves the limits of detection for these substances.

BRIEF DESCRIPTION OF THE DRAWING

FIG. 1 top, on the other hand, shows a sum spectrum using the same data set but treated using the method according to the invention.

DETAILED DESCRIPTION

Figure 1:
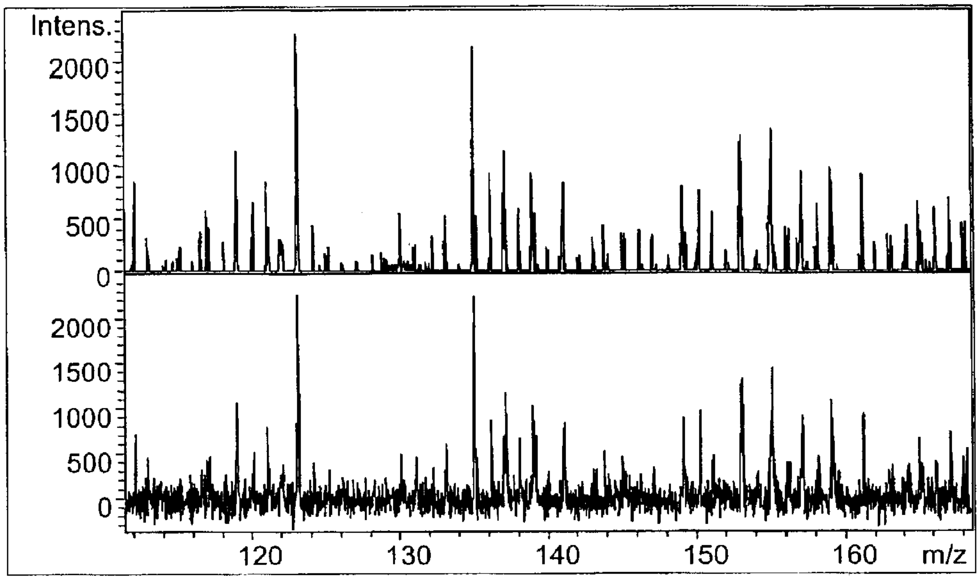
FIG. 1 bottom shows a section from a sum spectrum which was scanned according to the previous technique and consists of 100 single spectra, each of which was produced with a very small ion beam. The spectrum shows the usual noise but it impossible to distinguish between electronic noise and the noise of scattered ions.

FIG. 1 depicts two sum spectra, the bottom spectrum being representative of a combination of 100 spectra in a conventional manner. The top spectrum is the result of combining the same spectrum data using the method of the present invention. Unlike the usual methods of immediate addition, the single spectra were stored so that a comparison could be made between the conventional method and the method according to the invention using the same data set. It can be clearly seen that in most areas in the top spectrum, ion signals only appear where the mass to charge values are whole numbers. Here, there are no scattered ions but only electronic noise. Only in a few areas do scatter ions of unknown origin appear, for example, around m/z=130 atomic mass units per elementary charge. The signal-noise ratio is dramatically improved—calculation of the value of signal-to-noise could simply not be carried out in wide areas since the background is free of noise.

The top spectrum which has been scanned in accordance with the invention shows a series of ion signals which cannot be seen at all in the noise of the bottom spectrum which was scanned in the conventional manner since the ion signals no longer stand out from the noise. At first, this seems very surprising. Not until an accurate analysis of the statistical distributions has been carried out is it discovered that these ion signals, which generally consist of only a few ions, can be completely hidden in the electronic noise with its characteristically accidental properties.

The noise band which appears in the bottom spectrum, incidentally, is not identical to the noise bands of the single spectra since it is the sum of noise bands of the single spectra. However, it is interesting to see that there are quite a number of individual outlier signals pointing downward. These outlier signals can only be explained on the basis of statistics. There should now be approximately the same number of outlier signals pointing upward from the noise band. This observation shows that the signals pointing upward cannot be considered significant as ion signals.

In the following, the method is first outlined for the ion-trap mass spectrometer. Normally, only about 3 to 6 spectra are added in this type of spectrometer. In this case, the conventional method of subtracting the background from the sum spectrum after adding the single spectra does not produce spectra which are any worse than those using the method according to this invention. However, there are special analytical tasks where a very large number of spectra have to be summed. In this case, the method according to this invention, which is easier to perform in this type of mass spectrometer than in the other types of mass spectrometer described above, already yields a significant improvement.

The analysis of an STR (Short Tandem Repeat) will be looked at as an example. STRs consist of a strand of DNA (deoxyribonucleic acid) which contains a short sequence of 2, 3, 4, or 5 bases repeated several times (approximately 5 to 20 times). The number of repeats is different for each individual—there is a repeat number inherited from the father and a repeat from the mother. With the necessary control sections, STRs are 60 to 150 bases long and accordingly have molecular weights of approx. 15,000 to 50,000 atomic mass units. In an analysis, there are therefore two alleles, from the father and the mother, and two signals from the strand and counter-strand as well as artefact lines and this means that there are generally 6 to 8 molecules with molecular weights relatively close to one another that need to be measured.

These DNA segments are ionized by a static, nanoelectrospray from a sample which is dissolved in a capillary needle. Ions are produced which are multiply charged and show a wide range of charges. For molecules of approximately 30,000 atomic mass units, all the charge states ranging from 1 to 50 charges can be present, and there is a broad maximum between approx. 15 to 30 charges.

Mass spectrometers can only distinguish between ions with different mass-to-charge ratios m/z (where m=mass in atomic units and z=the number of elementary charges). Good ion-trap mass spectrometers have a maximum measurement range stretching up to m/z=3,000 atomic mass units per elementary charge at the most. If such an upper limit of mass range is set, there is a lower storage limit of approximately 300 masses per charge. Thus, all ions of the DNA segment from 1 to 50 charges are stored in the ion trap but only the ions between 10 and 50 charges can be measured since the ions with 1 to 9 charges are above the mass-to-charge ratio that can be measured for the spectrum. Anyway, the maximum for the distribution is well covered. (In ion-trap mass spectrometers which have been specially set up for the purpose, the ions which are above m/z=3,000 atomic mass units per elementary charge are not let into the ion trap, but this does not alter the basic consideration employed here).

Since, in this case, the isotope lines cannot be resolved, 40 peaks appear for each molecule in the spectrum which has been scanned. If six different molecules are superimposed, then there are 240 mass peaks—an extraordinarily complicated spectrum which can only be resolved by applying a so-called deconvolution method. The details of this method will not be given here.

However, only a moderate number of ion charges can be stored in an ion trap if the spectrum is to be scanned without interference. The number is relatively small; above approximately 1,000 ion charges, the space charge effect has a noticeably detrimental effect. With an average number of 25 elementary charges per ion, in this example, this represents only 40 ions, i.e. only approx. 1/6 ion per mass signal. For a good spectrum where the somewhat smaller mass signals are also recognized, approximately 100 to 200 spectra must be scanned in order to find at least approximately 15 to 30 ions on average in a mass peak. If a single ion in the single spectrum has an average height of approximately 10 counts above the average noise and the noise has an average value of approximately three counts and a standard deviation of approximately two counts, then the ion signal in the single spectrum is significantly distinguishable form the noise. When 200 single spectra are added without eliminating the noise, the standard deviation for the background noise increases to about 30 counts. However, since the signals represent different isotope compositions, the signals for the individual ions cannot simply be added up according to their height because they do not superimpose on the spectrum precisely. The height of a peak of 30 ions only adds up to approximately 50 to 100 counts and, at 2–3 times the standard deviation, can barely be read from the noise with any degree of significance.

If, on the other hand, the method according to this invention is used, the spectrum obtained can be calculated to give outstanding results similar to those shown by FIG. 1.

It is particularly difficult to implement the invention with time-of-flight mass spectrometers with orthogonal ion injection and a spectral scan with analog-to-digital converters. So far, event counters have only been used for time-of-flight mass spectrometers with orthogonal ion injection where the periodically registered events (the impact of individual ions) have been assembled to form a spectrum retrospectively. This type of detection also eliminates noise but only yields spectra with a very limited dynamic range since the primary ion beam has to be kept so small that no double ions or multiple ions appear in an event.

The limit to the dynamic range can be removed by using analog-to-digital converters (ADCs). However, the use of ADCs is critical if they have not been built entirely without background noise since the number of spectra which have to be added is extremely high. The use of economical analog-to-digital converters with slight background noise has been made possible for the first time ever with this invention since good spectra can only be produced by this invention.

These spectrometers have spectral scanning rates of 20,000 per second, each spectrum containing 25,000 measurement points. The spectra are added in a fast transient recorder with a conversion rate of about 500 MHz. In other words, only two nanoseconds per measured value are available for the elimination of noise and addition. In this case, the elimination of electronic noise can only take place in the transient recorder itself, but this is made possible by superfast electronic processors. The digitized instrument values can only be added to form the sum spectrum if the values exceed a threshold in each case. When time is extremely short, this can happen, for example, by testing whether one bit has been placed above the first bit (or above the second bit) in the measurement value. Since, in this case, not only the first bit (or not only one of the first two bits) has been set, the threshold consists of exactly one bit (or two bits); values are only added if they equal at least 2 (or 4). Tests such as this can take place in signal processors in a single processor cycle. The secondary electron multiplier is set up so that a single ion produces an average height with a value of at least 8.

In the third example, Time-of-Flight mass spectrometry with Matrix-Assisted Laser Desorption and Ionization is considered. Here, approximately 50 to 200 and in some cases a few thousand, spectra are regularly summed. Secondary electron multipliers are used in the form of multi-channel plates. For this reason, in principle, roughly the same considerations apply in regard to the background noise as described above for the ion-trap mass spectrometer case.

Here, transient recorders with a conversion rate of 1 to 4 GHz are used as analog-to-digital converters which hardly allow noise correction in real time. However, since the scanning rate is only approximately 10 to 100 single spectra per second and, in the latest generation of transient recorders, the single spectra can be transferred to the computer in between spectral scans via superfast transmission buses and processed further there, it is possible for the noise to be eliminated in accordance with the invention before addition to form the sum spectrum takes place in the computer.

What is claimed is:

1. Method for the acquisition of mass spectra of improved quality in mass spectrometers in which many individually digitized spectra are scanned and added to form a sum spectrum, wherein the electronic noise is removed by a computer algorithm routine from the single spectra before the single spectra are added to form the sum spectrum.

2. Method according to claim 1 wherein by means of a computer routine, all the values of the single spectra which lie within a specified noise band around the average value of the noise are not added to form the sum spectrum, and the average value of the noise is subtracted from all values which exceed the noise band before they are added to form the sum spectrum.

3. Method according to claim 2 wherein by means of a computer routine, the average value for the electronic noise is calculated as the sliding average over a predetermined number of measurement points.

4. Method according to claim 3 wherein the position of the noise band is determined by calculating the running average.

5. Method according to claim 3 wherein by means of a computer routine, the width of the noise band is increased by a predetermined value if less than a specified number of measurement points for the sliding average lie within the noise band.

6. Method according to claim 3 wherein by means of a computer routine, the position and width of the noise band is reset to a starting value when the processing of a new single spectrum begins.

7. Method according to claim 1 wherein by means of a computer routine, only the values of the single spectrum which exceeds a threshold value is added to form the sum spectrum.

8. Method according to claim 7 wherein the heights or areas of the mass peaks are calibrated before the quantitative evaluation of the sum spectrum is carried out.

9. Transient recorder for the acquisition of mass spectra comprising a scanning apparatus by which many individually digitized spectra are scanned and added to form a sum spectrum, wherein the electronic noise is removed by a computer algorithm routine from the single spectra before the single spectra are added to form the sum spectrum.

* * * * *